United States Patent [19]
Ota et al.

[11] Patent Number: 5,722,556
[45] Date of Patent: Mar. 3, 1998

[54] RESERVE TANK CAP HAVING EASILY MANUFACTURED INTEGRAL OVERFLOW PASSAGE AND RESERVE TANK

[75] Inventors: Yoshihiko Ota, Chiryu; Hiroyuki Kosaka, Kyoto, both of Japan

[73] Assignees: Nippondenso Co., Ltd., Kariya; Kyoraku Co., Ltd., Kyoto, both of Japan

[21] Appl. No.: 633,997

[22] Filed: Apr. 19, 1996

Related U.S. Application Data

[63] Continuation-in-part of Ser. No. 312,866, Sep. 27, 1994, abandoned.

[30] Foreign Application Priority Data

Sep. 28, 1993 [JP] Japan .................... 5-240924
Dec. 16, 1993 [JP] Japan .................... 5-67173

[51] Int. Cl.$^6$ ........................................ B65D 1/00
[52] U.S. Cl. ........................... 220/367.1; 220/785
[58] Field of Search ................... 220/367.1, 366.1, 220/785, 786, 913, DIG. 32

[56] References Cited

U.S. PATENT DOCUMENTS

| | | | |
|---|---|---|---|
| 3,216,148 | 11/1965 | Amberg | 220/785 X |
| 4,206,854 | 6/1980 | Takami | 220/366.1 X |
| 4,427,126 | 1/1984 | Ostrowsky | 220/366.1 X |
| 4,717,031 | 1/1988 | Hewson | 220/367.1 |

*Primary Examiner*—Steven M. Pollard
*Attorney, Agent, or Firm*—Cushman, Darby & Cushman IP Group of Pillsbury, Madison & Sutro LLP

[57] ABSTRACT

A reserve tank includes a tank body having an opening for pouring coolant into the tank body and a cap closing the first opening. The cap includes an overflow passage for discharging overheated coolant and vapor to the exterior of the tank body. The overflow passage has a second opening which opens in a downward direction. The overflow passage is formed in a groove shape on an inner surface of the cap. Additionally, when the cap fits onto the opening, a sloped portion is provided in the tank body to face the second opening portion. As a result, overflowing heated coolant and vapor are discharged from the second opening through the overflow passage, and are smoothly discharged along the sloped portion.

40 Claims, 11 Drawing Sheets

RESERVE TANK CAP HAVING EASILY MANUFACTURED INTEGRAL OVERFLOW PASSAGE AND RESERVE TANK

CROSS REFERENCE TO RELATED APPLICATION

This application is a continuation-in-part of U.S. application No. 08/312,866 filed Sep. 27, 1994, now abandoned, and claims priority from Japanese Patent application No. Hei. 5-240924, filed on Sep. 28, 1993 and Japanese Utility Model application Hei. 5-67173, filed on Dec. 16, 1993, the content of which are incorporated herein by reference.

BACKGROUND OF THE INVENTION

1. Field of the Invention

The present invention relates to a reserve tank for radiator used in vehicles.

2. Description of Related Art

Figure 14:
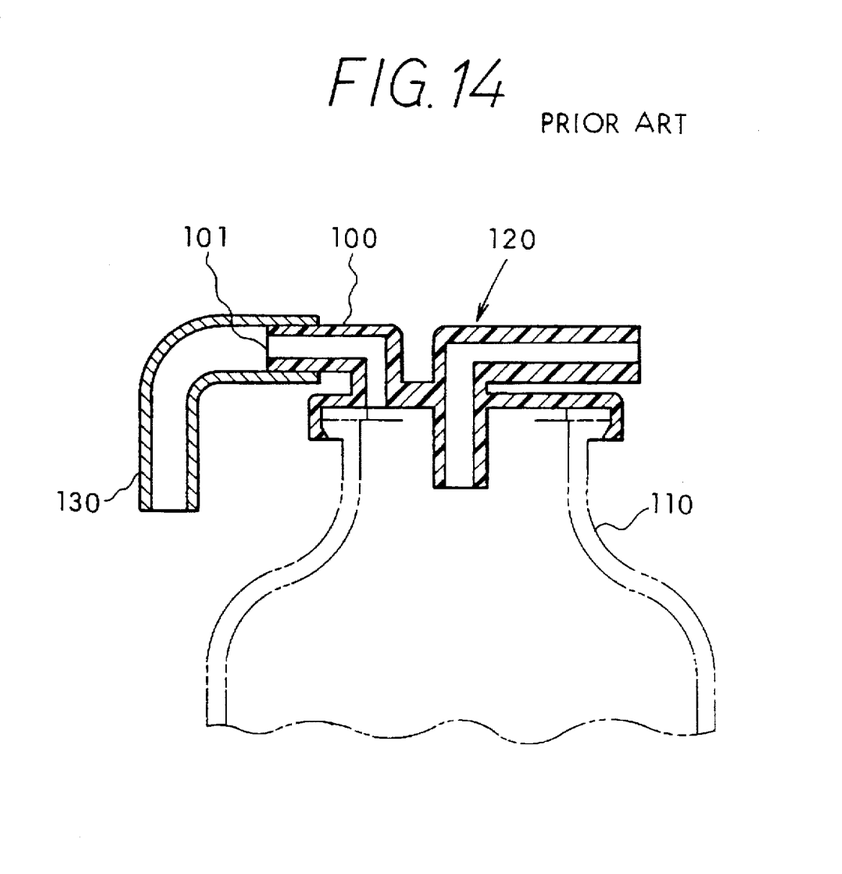
FIG. 14 is a cross-sectional view of a cap having a conventional overflow passage and hose.

A conventional vehicle having a water-cooled internal combustion engine is provided with a reserve tank for storing coolant which leaks from its radiator. A reserve tank, as shown in FIG. 14, has overflow passage 100 for releasing atmospheric air trapped in the tank. The overflow passage 100, for example, is installed on cap 120 which closes opening 110 of the reserve tank.

The conventional reserve tank must be connected to the inside of overflow passage 100. Because overflow passage 100 includes a hollow center, when overflow passage 100 is formed from resin with cap 120, the manufacturing process is complicated and overflow passage 100 must open horizontally or vertically due to the necessity of drawing a die through overflow passage 100. Therefore, overflow passage 100 is formed so that opening 101 is directed horizontally.

Therefore, the conventional reserve tank has an overflow passage 100 connected to a rubber hose 130 for security. This is to avoid damage that may be caused to someone By hot water discharged from overflow passage 100 or by vapor when the hood is opened and the person stands near the reserve tank. Hot water or vapor discharged from overflow passage 100 may reach 140° C. Thus, there is a problem of increased manufacturing cost because a rubber hose is necessary for security when using the conventional reserve tank.

Figure 15:
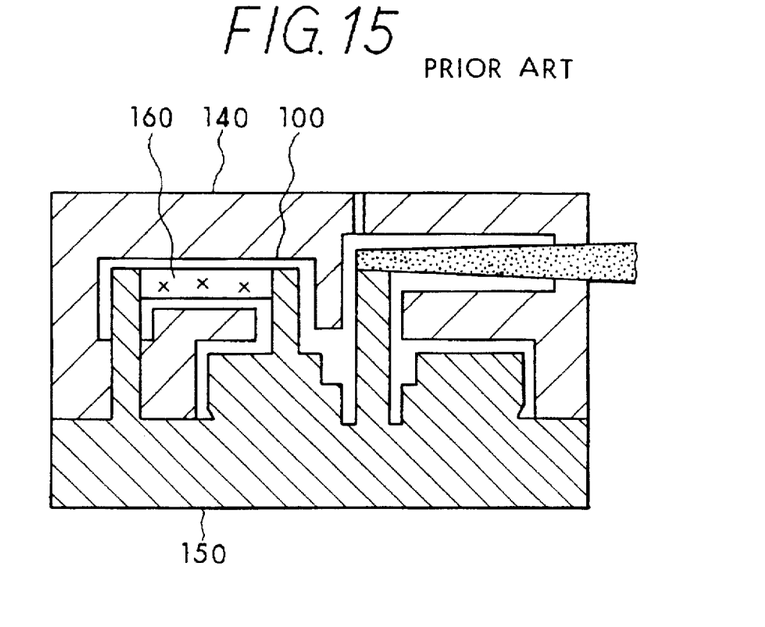
FIG. 15 is a cross-sectional view of upper and lower dies for producing a conventional cap using a mold injection technique.
Figure 16:
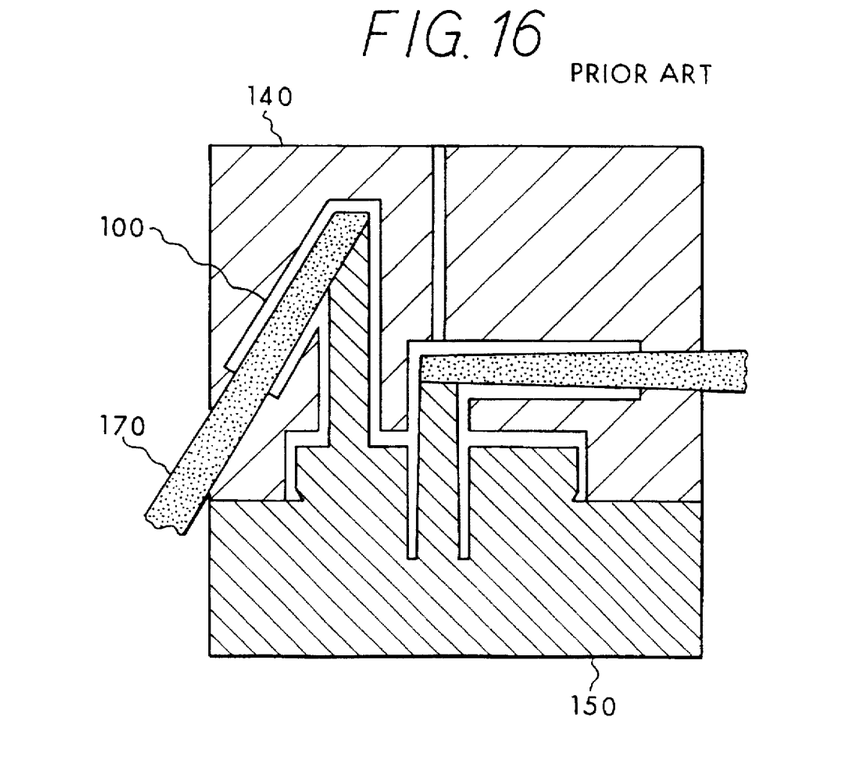
FIG. 16 is a cross-sectional view of the upper and lower dies for producing the conventional cap using a mold injection technique.

To reduce the number of parts, hose 130 and overflow passage may be integrally formed. Opening 101 of overflow passage 100 is formed downward. As shown in FIG. 15, space 160 is created inside overflow passage 100 between upper die 140 and lower die 150. When resin is injected between the dies, the inside of overflow passage 100 at space 160 is filled with resin. To prevent the creation of space 160, overflow passage 100 is slanted downwardly as shown in FIG. 16. Slide die 170 is inserted upward into slanted overflow passage 100. However, in this case overflow passage 100 becomes bigger and taller so that the weight, cost and size of the reserve tank are increased.

SUMMARY OF THE INVENTION

In view of the above problems, an object of the present invention is to provide a reserve tank which allows overflow coolant to flow smoothly without increasing the production coat of the unit.

For achieving the above object, the reserve tank includes a tank body having an opening for delivering coolant into the tank body and a cap closing the opening. The cap includes an overflow passage for discharging overheated coolant and vapor to the exterior of the tankbody. The overflow passage has an exterior portion opening in downward direction. The overflow passage has a groove shape on an inner surface of the cap.

Based on such a construction of the above-described invention, the interior and exterior of the tank body are connected through an overflow passage formed on the inner surface of the cap. Therefore, when the internal pressure of the tank body rises, hot coolant overflowing from the tank body and vapor are discharged to the exterior of the tank body through the overflow passage. Since the exterior portion thereof opens downward, hot coolant and vapor flowing through the overflow passage from the opening portion are discharged toward the surface of a sloped portion of the tank body. Since this portion slopes in a downward direction, hot coolant and vapor are directly discharged to the ground.

Other objects and features of the invention will appear in the course of the description thereof, which follows.

BRIEF DESCRIPTION OF THE DRAWING

Other objects, features and characteristics of the present invention as well as the function of related parts, will become clear from study of the following detailed description, the appended claims, and the accompanying drawings. In the drawings:

DETAILED DESCRIPTION OF THE PRESENTLY PREFERRED EXEMPLARY EMBODIMENTS

Preferred embodiments of the present invention are hereinafter described with reference to the accompanying drawings.

Figure 1:
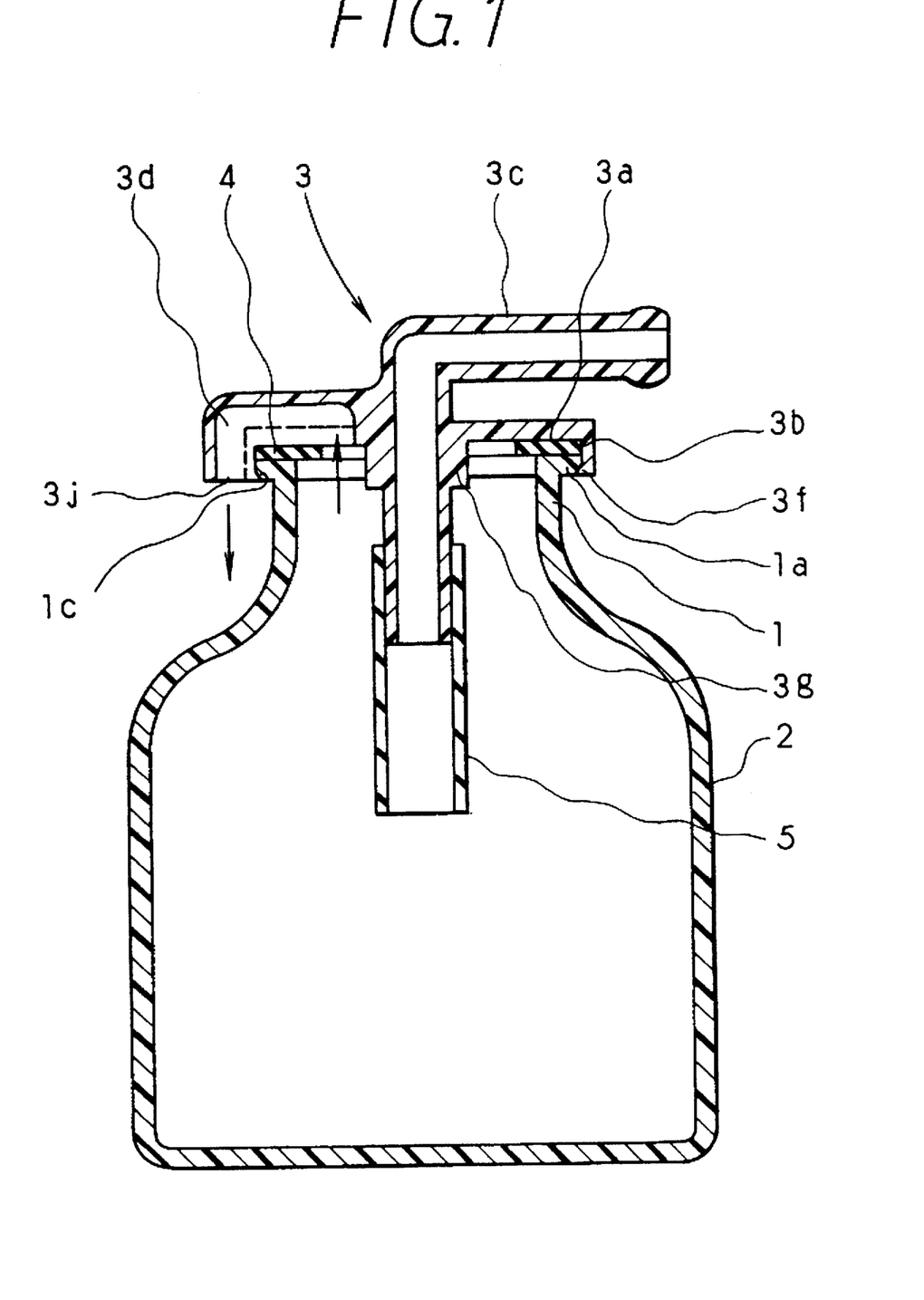
FIG. 1 is a cross-sectional view of a reserve tank according to a first embodiment of the present invention.

Hereinafter, a first embodiment of the present invention described with reference to FIGS. 1–7. FIG. 1 is a cross-sectional view of a reserve tank according to the first embodiment. The reserve tank includes tank body 2 having opening 1 for pouring coolant into the tank, cap 3 for closing opening 1 and rubber gasket 4 for sealing opening 1 and cap 3 together. Tank body 2 is made of polypropylene resin and is formed by blow molding. Tank body 2 has a substantially cylindrical shape.

Opening 1 has a cylindrical shape and is provided in the center of an upper surface of tank body 2. An end portion of opening 1 has fitting portion 1a for fitting with cap 3. An edge of a corner portion 1c of fitting portion 1a is chamfered. Cap 3, made of polypropylene resin, includes cylindrical lid portion 3a, annular outer peripheral wall portion 3b, connecting pipe 3c and overflow passage 3d. Lid portion 3a covers and closes opening 1. Annular outer peripheral wall portion 3b extends downwardly to fit onto fitting portion 1a of opening 1.

Handle 3e (shown in FIG. 2) used for detaching cap 3 is provided on a peripheral edge portion of lid portion 3a. At the inner circumference of the end of the outer peripheral wall portion 3b, slanted portion 3f extends inside toward the center of cap 3 from outer peripheral wall portion 3b to engage with corner portion 1c. Slanted portion 3f may be formed on only a part of the periphery of cap 3 or all along the inner periphery thereof. Cap 3 is press-fitted in opening 1 by the slanted portion 3f provided on outer peripheral wall portion 3b and is secured to corner portion 1c of fitting portion 1a.

Connecting pipe 3c connects a radiator to tank body 2 through an overflow hose (not shown). Connecting pipe 3c penetrates through the center portion of lid portion 3a. On the outside of cap 3, connecting pipe 3c is formed in a direction that extends upward from cap 3 and then turns and extends in a horizontal direction. As a result, connoting pipe 3c connects overflow hose with tank body 2. In the interior of tank body 2, connecting pipe 3c extends downward below the bottom of cap 3. Inner hose 5 made of rubber is connected thereto.

Figure 2:
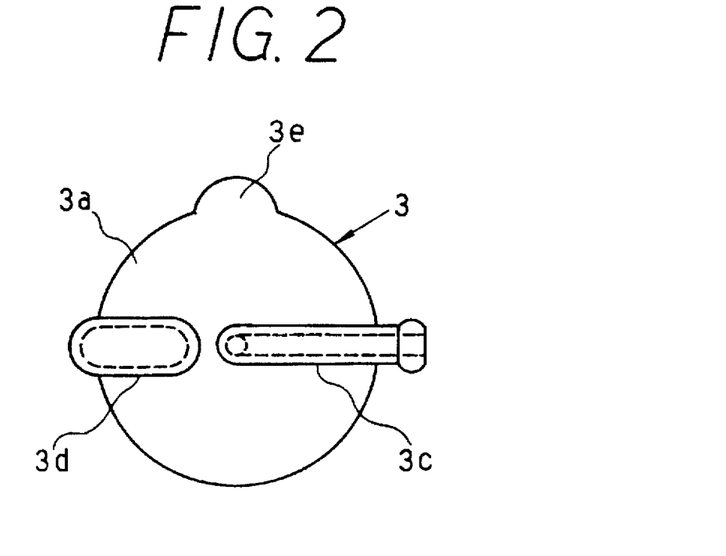
FIG. 2 is a top view of the cap of FIG. 1.
Figure 3:
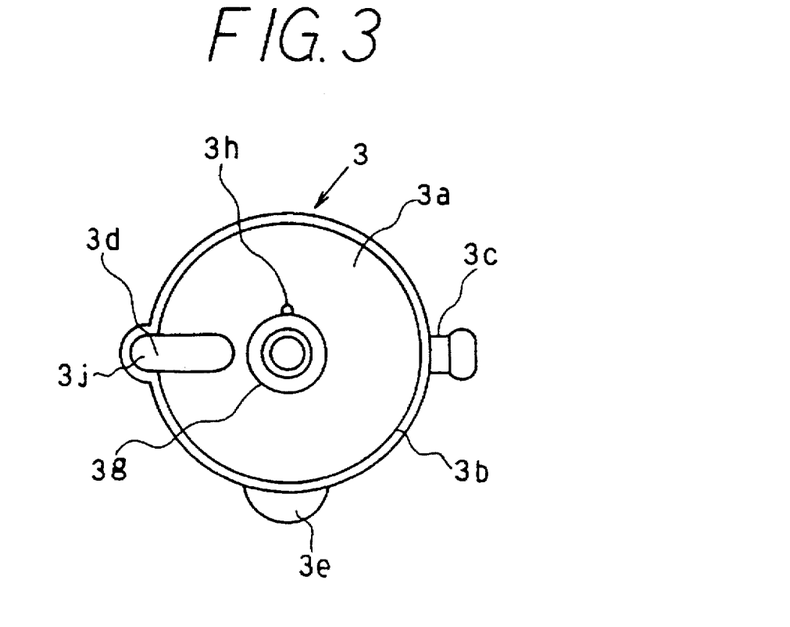
FIG. 3 is a Bottom view of the cap of FIG. 1.

Overflow passage 3d is formed on the back side of lid portion 3a to have groove-shape, U-shape, or ditch shape as shown in FIGS. 2 and 3. Since overflow passage 3d has an exterior opening 3j opening downwardly outside of opening 1, overflow passage 3d connects the interior of tank body 2 and the exterior environment in order to discharge heated coolant or vapor overflowing from tank body 2 outside the tank. When observed from the interior of tank body 2, overflow passage 3d appears to have a hollow groove-shape or a ditch shape as shown in FIG. 3. The walls of cap 3 are of constant thickness; therefore, lid portion 3a swells in the region of overflow passage 3d. Overflow passage 3d, which is provided at a location adjacent connecting pipe 3c of lid portion 3a across outer peripheral wall portion 3b to straddle fitting portion 1a of opening 1, has opening portion 3j opening towards the outside of outer peripheral wall portion 3b. Accordingly, when cap 3 fits onto opening 1, the side of lid portion 3a containing overflow passage 3d opens inside opening 1, and opening portion 3j opens outside of opening 1. As a result, the interior and exterior of tank body 2 are connected through overflow passage 3d. Tank body 2 opens to the atmosphere via overflow passage 3d.

Figure 4:
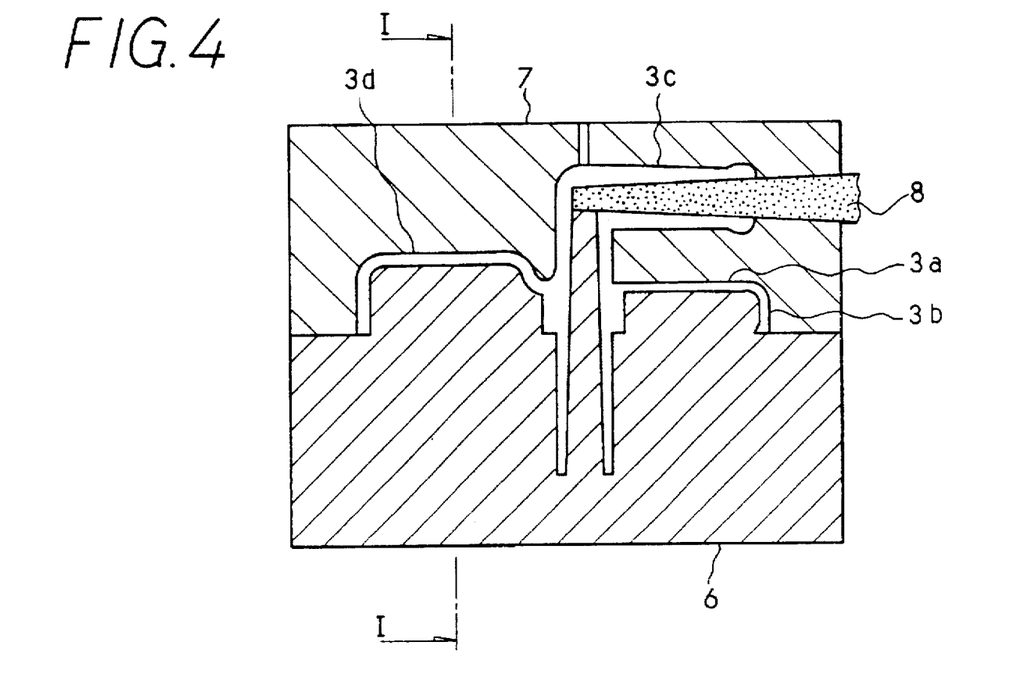
FIG. 4 is a cross-sectional view of upper and lower dies for producing the cap of FIG. 1 using a mold injection process.
Figure 5:
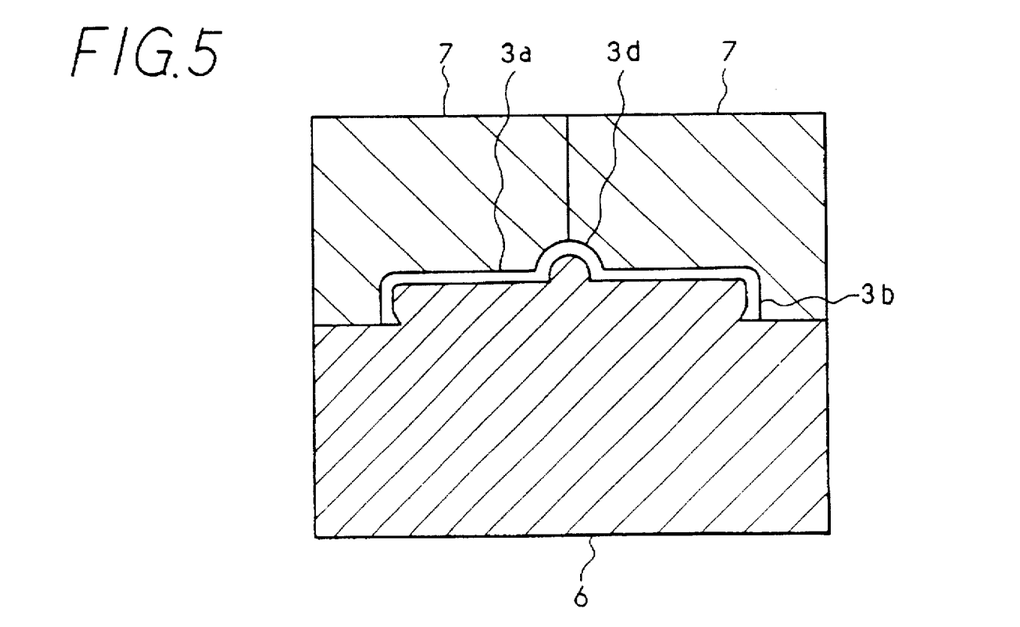
FIG. 5 is a cross-sectional view of the upper and lower dies of FIG. 4 taken along the line I—I of FIG. 4.

The above cap 3 is formed by injection molding using a lower die 6, upper die 7, and slide die 8 as shown in FIGS. 4 and 5. Upper die 7 is divided along an axis of connecting pipe 3c into two parts, because upper die 7 is formed so that connecting pipe 3c formed at the outside of cap 3 makes a perpendicular turn. Slide die 8 is used to form an opening portion of connecting pipe 3c extending in the horizontal direction. Overflow passage 3d is formed by hollowing a groove-shape, U-shape or a ditch shape in the inside of lid portion 3a without forming a pipe configuration like connecting pipe 3c. Therefore, overflow passage 3d is formed integrally with lid portion 3a and outer peripheral wall portion 3b by using only upper die 7 and lower die 6 without the use of another slide die.

Figure 6:
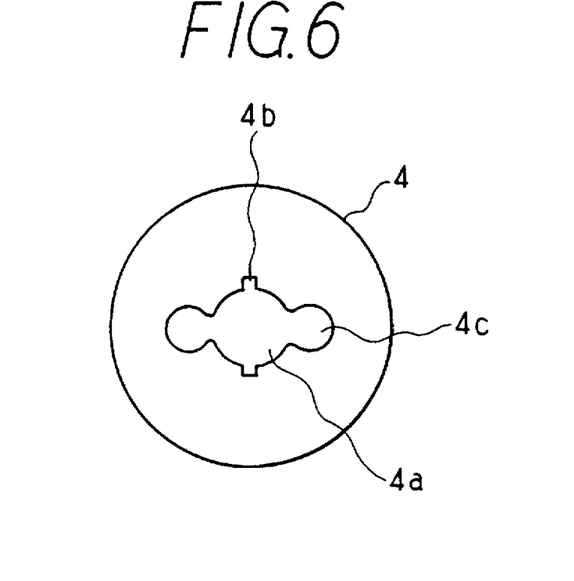
FIG. 6 is a plane view of a gasket according to the first embodiment.
Figure 7:
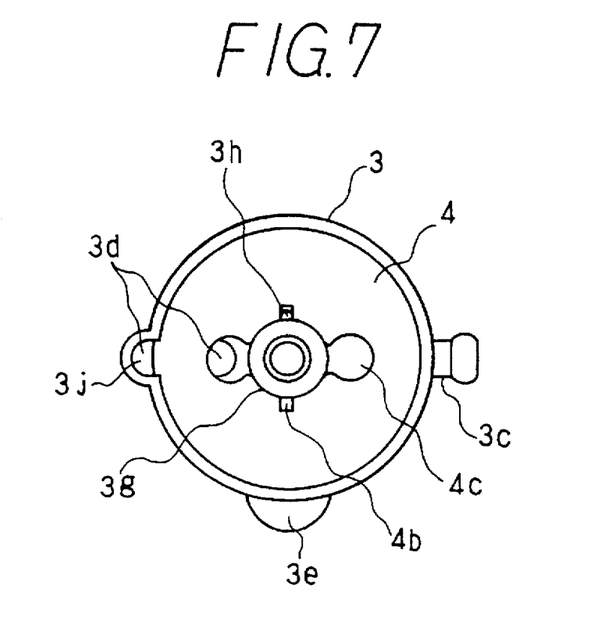
FIG. 7 is a bottom view of the cap of FIG. 1 with the gasket fitted thereon.

Gasket 4 is press-fitted to the inside of cap 3 (the back of lid portion 3a) and forms a fluid-tight seal between cap 3 and opening 1. Gasket 4 is shown in FIG. 6. Gasket 4 has fitting hole 4a, location hole 4b and connecting hole 4c. A pair of location holes 4b and connecting holes 4c are formed at both sides of fitting hole 4a. Therefore, gasket 4 can be easily press-fitted into cap 3 from either side. Fitting hole 4a is fitted to boss portion 3g formed around connecting pipe 3c at the back of lid portion 3a as shown in FIGS. 1 and 7. Each location hole 4b is fitted to a location protrusion 3h formed around boss portion 3g. Overflow passage 3d opens inside tank body 2 through connecting hole 4c of gasket 4. Overflow passage 3d at the outside of outer peripheral wall portion 3b opens at the exterior of outer peripheral wall portion 3b without being sealed by gasket 4, as shown in FIG. 7.

New, operation of the reserve tank will be explained.

When the inner pressure of the radiator exceeds a predetermined pressure and the coolant is at a high temperature, coolant inside the radiator flows out from the overflow pipe (not shown) of the radiator. The overflowing coolant is fed to the connecting pipe 3c provided in cap 3 through the overflow hose and flows into the tank body 2 from connecting pipe 3c through inner hose 5.

Then, because the interior and exterior of tank body 2 are connected through overflow passage 3d formed in cap 3, when the interior pressure of the reserve tank rises due to the high temperature of the coolant flowing into tank body 2, surplus hot water and vapor in tank body 2 are discharged to the exterior of tank body 2 through overflow passage 3d (the flow of heating water and vapor are shown in FIG. 1 by the arrows). At that time, because opening portion 3j opens downward, hot water and vapor that overflow from tank body 2 are discharged downward.

Later, when coolant temperature becomes low and the inner pressure of the radiator becomes low, coolant accumulated in tank body 2 is discharged through inner hose 5 and returns to the inside of the radiator through connecting pipe 3c and the radiator overflow hose.

A second embodiment of the present invention will be described with reference to FIGS. 8–12. Reference numerals in second embodiment having the same numerals as in the first embodiment describe the same structure and function. Therefore, explanations for parts having the same numerals as in the first embodiment are omitted.

A wide area on the surface of tank body 2 of the first embodiment shown in FIG. 1 may be contaminated by overflowing coolant since opening portion 3j of overflow passage 3d is adjacent to the outer peripheral wall portion 3b. Overflowing coolant flows along the surface of tank body 2 or accumulates on the surface of tank body 2. When dirt and dust adhere to overflowing coolant on the surface of tank body 2 and the coolant evaporates, dirt and dust adhere to the surface of tank body 2 and contaminate the surface.

Figure 8:
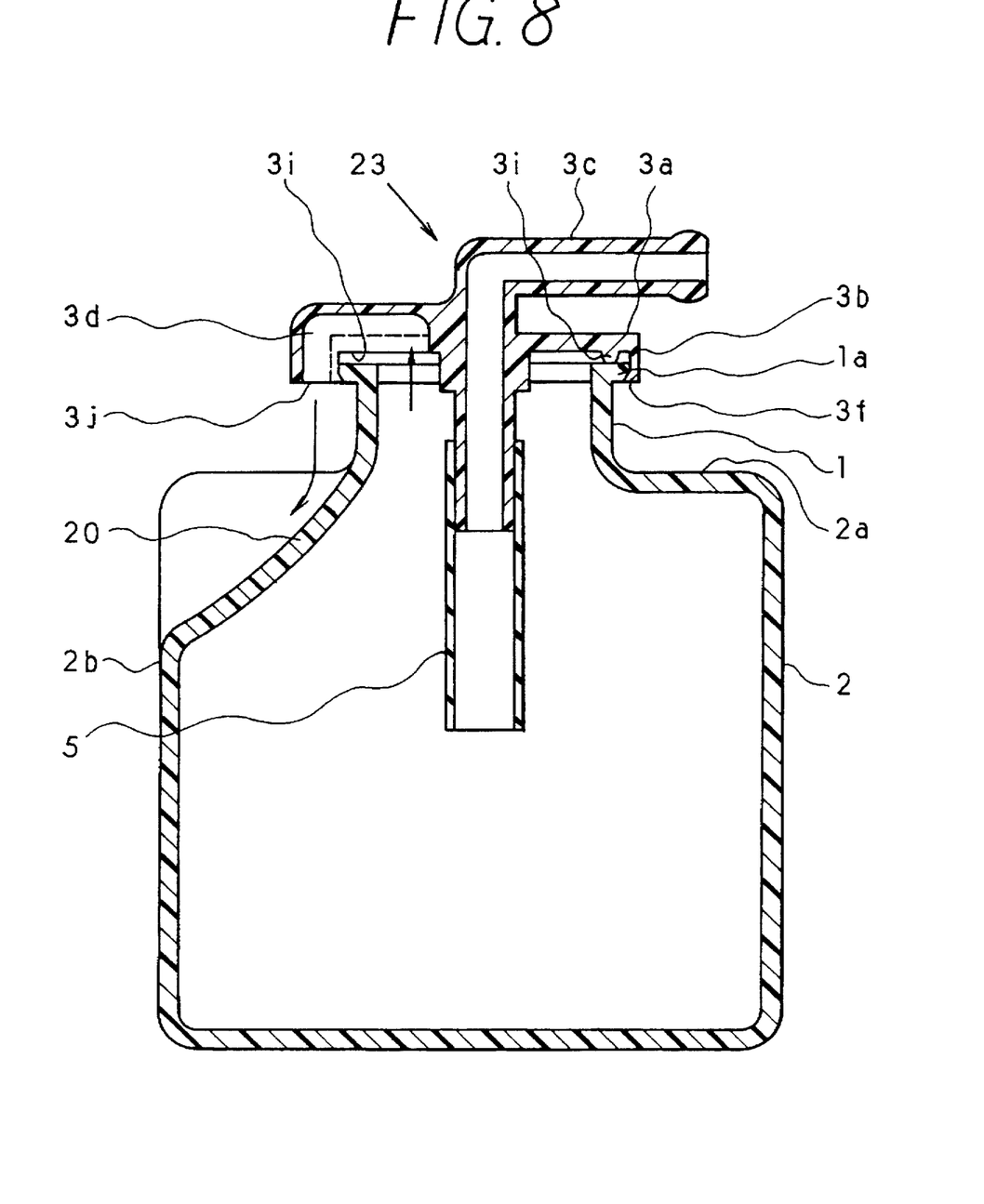
FIG. 8 is a cross-sectional view of a reserve tank according to a second embodiment of the present invention.
Figure 9:
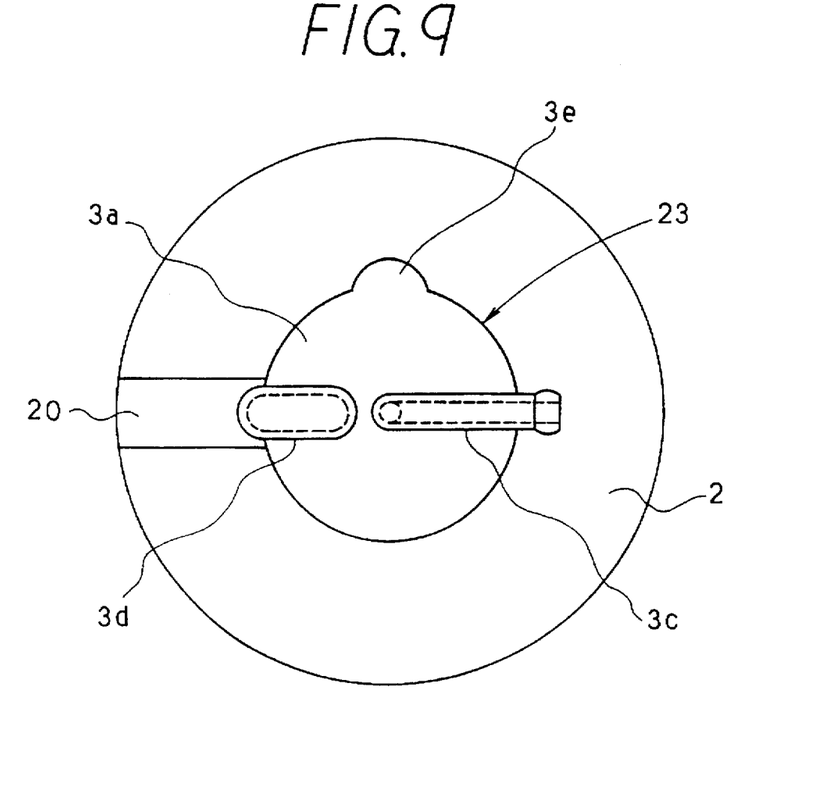
FIG. 9 is a top view of the cap of FIG. 8.
Figure 10:
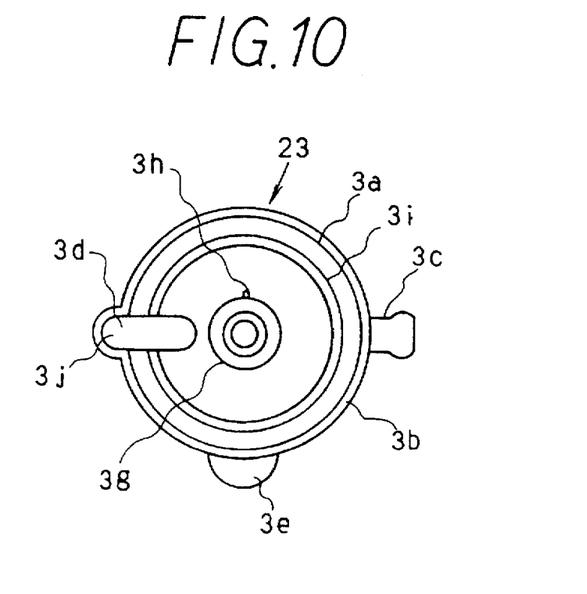
FIG. 10 is a bottom view of the cap of FIG. 8.

To solve the above problem, a second preferred embodiment as shown in FIGS. 8–10 has a part 20 of tank body 2 sloped and recessed to have a groove shape, and the sloped portion 20 acting as an overflowing coolant passage is formed at a location to adjacent opening portion 3j. That is, tank body 2 has a substantially cylindrical shape; however, sloped portion 20 is formed in one part of upper surface shoulder portion 2a and slopes between a location adjacent opening 1 and peripheral wall 2b.

As shown in FIG. 10, cross-sectional semicircular projection portion 3i is formed on lid portion 3a of cap 23 around the entire upper surface of fitting portion 1a. The inner surface of lid portion 3a is opposite the top surface of tank body 2. When cap 23 fits onto tank body 2, projection portion 3i contacts tightly with fitting portion 1a.

Figure 11:
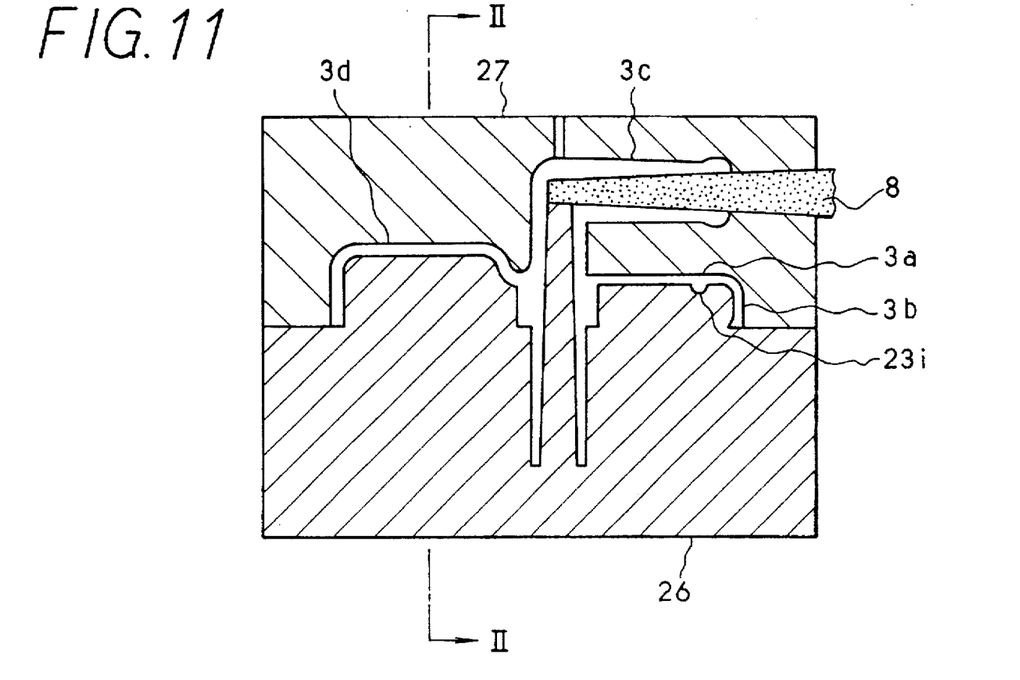
FIG. 11 is cross-sectional view of upper and a lower dies for producing the cap of FIG. 8 using a mold injection technique.
Figure 12:
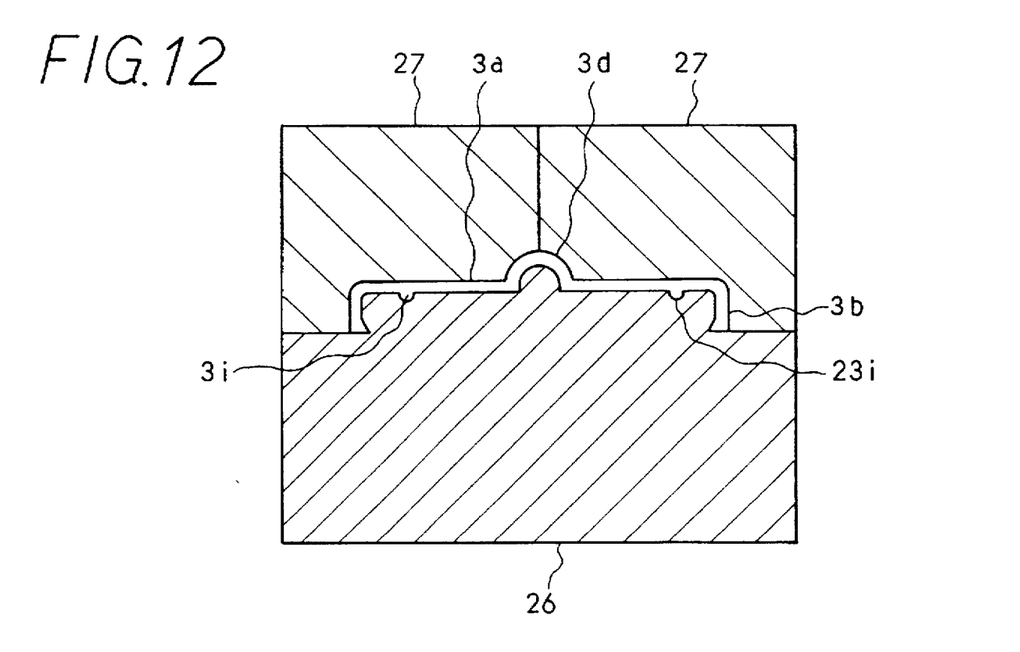
FIG. 12 is a cross-sectional view of the upper and lower dies taken along the line II—II of FIG. 11.

The above cap 23 is formed by injection molding using lower die 26, upper die 27, and slide die 8 as shown in FIGS. 11 and 12. Upper die 27 is the same as upper die 7 in the first embodiment. Lower die 26 has groove 23i to form projection portion 3i.

The operation of the second embodiment will now be explained.

In this embodiment, cap 23 has projection portion 3i integral therewith. Furthermore, projection portion 3i closely contacts fitting portion 1a of opening 1; therefore, seal pressure at the tip of projection portion 3i is raised and sealing for cap 23 is securely performed. Accordingly, all hot water and vapor in tank body 2 flow out from overflow passage 3d without any leakage from fitting portion 1a.

Additionally, the cap 23 may be formed at a lower cost because the sealing function of this projection portion 3i does not require any special seal material such as gasket 4. Further, opening portion 3j opens downward and heated water and vapor overflowing from tank body 2 are discharged downward along sloped portion 20. As a result, the surface of the tank body 2 except sloped portion 20 is not contaminated by dirt and dust.

Figure 13:
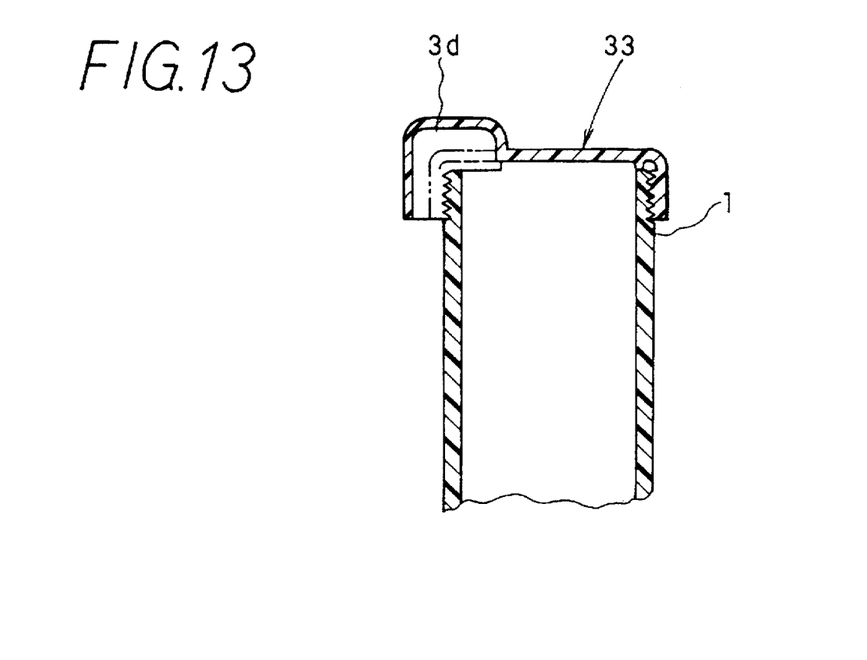
FIG. 13 is a partial cross-sectional view of a reserve tank according to a third embodiment of the present invention which uses thread engagement.

A third preferred embodiment of the present invention will now be described with reference to FIG. 13. In this figure, cap 33 fits onto opening 1 of tank body 32. Cap 33 and opening 1 are secured together by a thread arrangement. Further, in the second embodiment, sloped portion 20 is provided on one part of tank body 2 in a downward direction from opening portion 3j, but there may be no need for sloped portion 20 if tank body 2 is formed in a vertically straight configuration, i.e., in a test tube configuration as shown in FIG. 13.

In the second embodiment, the cross-section of projection portion 3i is semicircular, as shown in FIG. 8, but the main requirement is that a line contact between fitting portion 1a and projection portion 3i is formed. Therefore, an inverted triangular cross-section of projection portion 3i is also possible. Further, in the second embodiment, sloped portion 20 is provided in only one part of tank body 2, but sloped portion 20 may be formed around the entire circumference of opening 1 of the tank body 2 by forming a tapered shape on the circumference of opening 1 of the tank body 2. In this case, it is not necessary to locate the overflow passage 3d directly over the sloped portion 20, and the cap may be freely fitted to the tank body.

Figure 17:
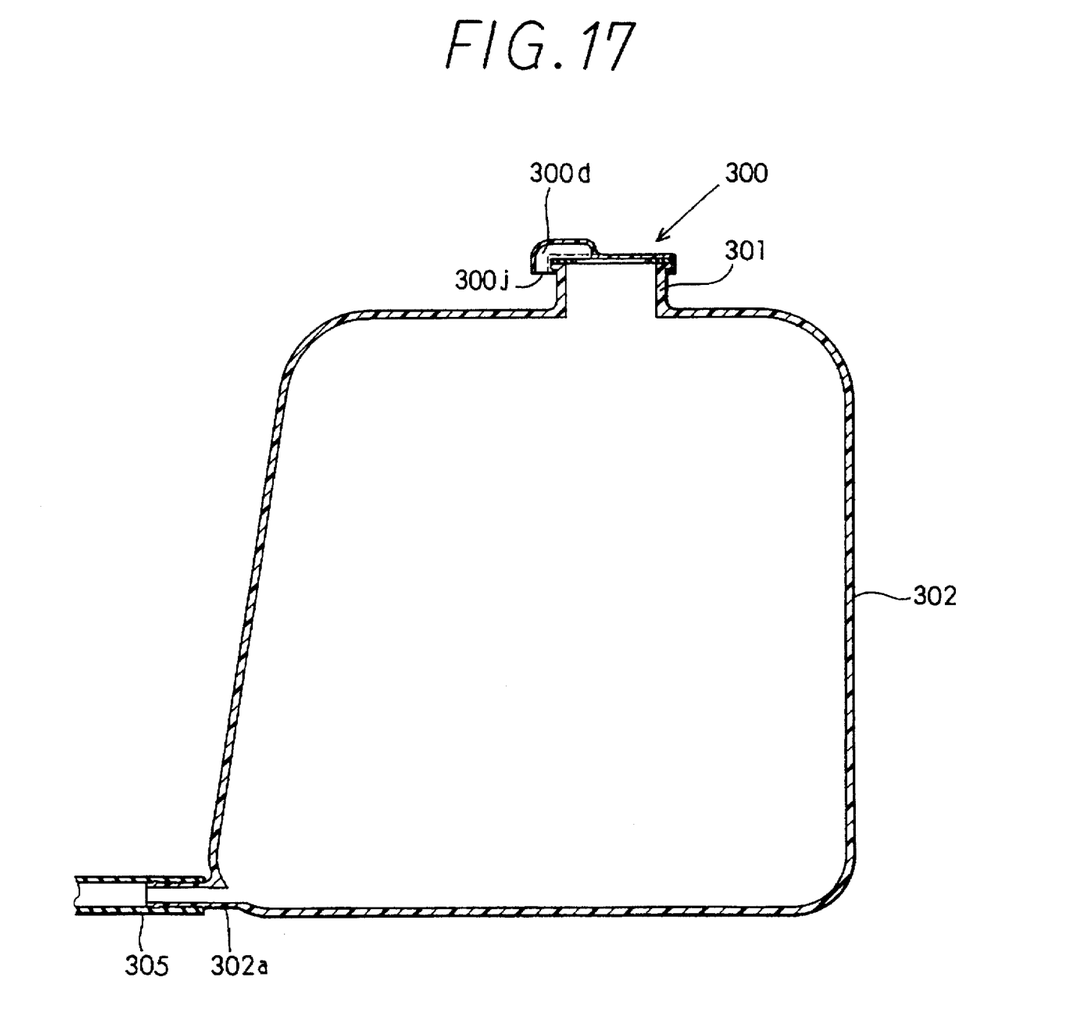
FIG. 17 is a cross-sectional view of a reserve tank according to a fourth embodiment of the present invention.
Figure 18:
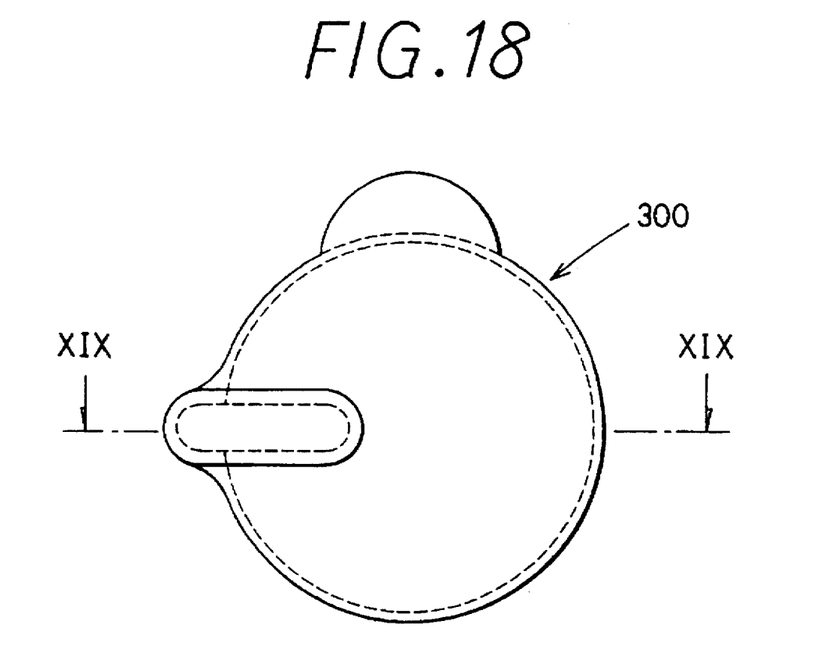
FIG. 18 is a top view of the cap of FIG. 17.
Figure 19:
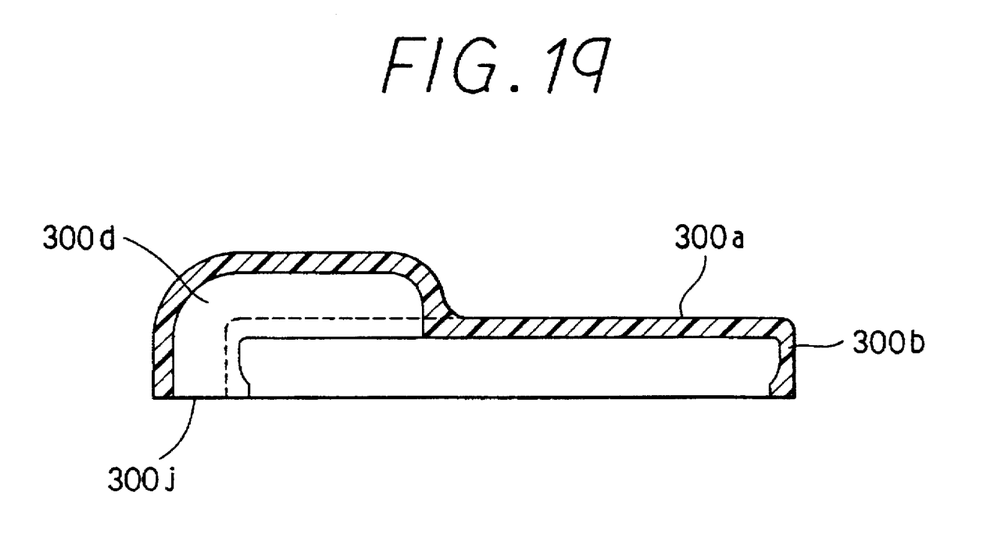
FIG. 19 is a cross-sectional view taken along the line XIX—XIX of FIG. 18.

Next, a fourth embodiment is described with reference to FIGS. 17–19.

In the fourth embodiment, a cap 300 is not provided with a connecting pipe for discharging coolant to the radiator. Instead, the tank body 302 is provided with a connecting pipe 302a, and the connecting pipe 302a is connected to a radiator (not shown) through a hose 305.

In the fourth embodiment, when the inner pressure of the radiator exceeds a predetermined pressure and the coolant is at a high temperature, coolant inside the radiator flows out from the overflow pipe (not shown) of the radiator. The overflowing coolant is fed to the connecting pipe 302a provided in the tank body 302 through hose 305 and flows into tank body 302.

Further, in the same manner as each of the above embodiments, when the interior pressure of the reserve tank rises due to the high temperature of the coolant flowing into tank body 2, surplus hot water and vapor in tank body 302 are discharged to exterior of tank body 302 through overflow passage 300d. Since opening portion 300j opens downward, hot water and vapor that overflow from tank body 302 are discharged downward.

When coolant temperature becomes low and the inner pressure of the radiator become low, coolant accumulated in tank body 2 is discharged through hose 305 and returns to the inside of the radiator through connecting pipe 302a.

The present invention can discharge coolant that overflows from a tank body towards the ground by using an opening portion without the need for other Darts such as rubber hoses which are required in conventional devices. The opening portion of the overflow passage formed in the inner surface of the cap opens to the exterior of the tank.

Particularly, this invention can easily discharge coolant towards the ground by forming a sloped portion in the tank body which slopes towards the ground from the opening portion. In effect, the area of the tank body contaminated by coolant become small and coolant does not accumulate on the surface of the tank body, despite the fact that the overflow passage is formed in the cap and opens near the opening of the tank body.

This invention has been described in connection with what are presently considered to be the most practical and preferred embodiments. However, this invention is not meant to be limited to the disclosed embodiments. Rather, the invention is intended to encompass all modifications and equivalent arrangements included within the spirit and scope of the appended claims.

What is claimed is:

1. A cap for a reserve tank comprising:

a lid portion for covering an opening of said reserve tank;

an inlet connecting pipe extending through said lid portion and constructed and arranged to connect said reserve tank with an outside fluid source;

an outer peripheral wall portion integral with said lid portion, said outer peripheral wall portion extending from a periphery of said lid portion for securing said cap in covering relation with respect to said reserve tank, said outer peripheral wall portion having a protruding portion which protrudes radially outwardly from surfaces of said tank surrounding the opening of said tank;

said lid portion and said protruding portion of said outer peripheral wall defining an overflow passage communicating an interior of said reserve tank with an exterior of said reserve tank, said overflow passage including:

a radially extending groove formed in said lid portion; and a discharge groove formed by said protruding portion of said outer peripheral wall portion, said discharge groove communicating with said radially extending groove and extending downwardly from said radially extending groove to discharge fluid to the exterior of said reserve tank;

said radially extending groove in said lid portion and said discharge groove formed by said protruding portion providing a continually opened path of fluid communication between said inlet connecting pipe and the exterior of said reserve tank so that high pressure fluid received within said reserve tank through said inlet connecting pipe can be discharged from said reserve tank through said radially extending groove and said discharge groove;

wherein said lid portion and said radially extending groove formed therein, said outer peripheral wall and protruding portion thereof, and said connecting pipe extending through said lid portion are formed as an integrally molded unitary structure.

2. A cap according to claim 1, wherein said discharge groove is substantially parallel with a longitudinal axis of said reserve tank when said cap is connected to said reserve tank.

3. A cap according to claim 1, wherein said outer peripheral wall defines a circle enclosing a portion of said connecting pipe; and said radially extending groove from said circle radially outwardly.

4. A cap according to claim 1, wherein an inlet of said overflow passage is coplanar with said lid portion.

5. A cap according to claim 1, wherein an outlet of said discharge groove is coplanar with an edge of said outer peripheral wall portion.

6. A cap according to claim 1, wherein said integrally molded unitary structure is formed by molding with a pair of dies.

7. A cap according to claim 1, further comprising a gasket, and wherein said cap fits onto said opening of said reserve tank so as to hold a periphery of said gasket in sealing relation with respect to said opening, said gasket having a communication hole for communicating an interior of said reserve tank with said overflow passage.

8. A reserve tank unit comprising:
  (a) a reserve tank body having an opening;
  (b) a cap secured in covering relation over said reserve tank body opening, said cap including:
    (i) a lid portion for covering an opening of said reserve tank body;
    (ii) an inlet connecting pipe extending through said lid portion and constructed and arranged to connect said reserve tank body with an outside fluid source;
    (iii) an outer peripheral wall portion integral with said lid portion, said outer peripheral wall portion extending from a periphery of said lid portion for securing said cap in covering relation with respect to said reserve tank body opening, said outer peripheral wall portion having a protruding portion which protrudes radially outwardly from surfaces of said reserve tank body surrounding the opening of said reserve tank body;

said lid portion and said protruding portion of said outer peripheral wall defining an overflow passage communicating an interior of said reserve tank body with an exterior of said reserve tank body, said overflow passage including:
  a radially extending groove formed in said lid portion; and
  a discharge groove formed by said protruding portion of said outer peripheral wall portion, said discharge groove communicating with said radially extending groove and extending downwardly from said radially extending groove to discharge fluid to the exterior of said reserve tank body;

said radially extending groove in said lid portion and said discharge groove formed by said protruding portion providing a continually opened path of fluid communication between said inlet connecting pipe and the exterior of said reserve tank so that high pressure fluid received within said reserve tank through said inlet connecting pipe can be discharged from said reserve tank through said radially extending groove and said discharge groove;

wherein said lid portion and said radially extending groove formed therein, said outer peripheral wall and protruding portion thereof forming said discharge groove, and said connecting pipe extending through said lid portion are formed as an integrally molded unitary structure.

9. A reserve tank unit according to claim 8, wherein said discharge groove is substantially parallel with a longitudinal axis of said reserve tank body when said cap is connected said reserve tank body.

10. A reserve tank unit according to claim 8, wherein said outer peripheral wall defines a circle enclosing a portion of said connecting pipe; and said radially extending groove protrudes from said circle radially outwardly.

11. A reserve tank unit according to claim 8, wherein an inlet of said overflow passage is coplanar with said lid portion.

12. A reserve tank unit according to claim 8, wherein an outlet of said discharge groove is coplanar with an edge of said outer peripheral wall portion.

13. A reserve tank unit according to claim 8, wherein said integrally molded unitary structure is formed by molding with a pair of dies.

14. A reserve tank unit according to claim 8, further comprising a gasket, and wherein said cap fits onto said opening of said reserve tank body so as to hold a periphery of said gasket, in sealing relation with respect to said opening said gasket having a communication hole for communicating an interior of said reserve tank body with said overflow passage.

15. A reserve tank unit according to claim 8, further comprising:
  a gasket disposed between said cap and said reserve tank body, said gasket having a communication hole for communicating an interior of said reserve tank body with said overflow passage.

16. A reserve tank unit according to claim 8, wherein:
  said outer peripheral wall portion of said cap has a protrusion on an interior surface thereof; and
  said end portion of said reserve tank body opening has a chamfered edge engaging said protrusion on said interior surface of said outer peripheral wall portion.

17. A reserve tank unit according to claim 8, wherein:
  said outer peripheral wall portion of said cap has screw threads on an interior surface thereof; and
  said end portion of said reserve tank body opening has screw threads on an exterior surface thereof which engages with said screw threads on said interior surface of said outer peripheral wall portion.

18. A reserve tank unit according to claim 8, wherein a portion of a wall portion of said reserve tank body most proximate to said overflow passage outlet is sloped relative to a remainder of said wall of said reserve tank body;

whereby fluid discharge from said discharge groove travels down said sloped wall portion.

19. A cap for a reserve tank for a motor vehicle, said reserve tank constructed and arranged to contain cooling fluid under pressure for cooling the motor vehicle engine, said cap comprising:

a lid portion for covering an opening of said reserve tank;

an inlet connecting pipe extending through said lid portion and constructed and arranged to connect said reserve tank with an outside fluid source;

an outer peripheral wall portion integral with said lid portion, said outer peripheral wall portion extending from a periphery of said lid portion for securing said cap in covering relation with respect to said reserve tank, said outer peripheral wall portion having an engaging portion and a protruding portion, said engaging portion adapted to form continuous peripheral contact with a surface surrounding the opening of said tank, and said protruding portion protruding radially outwardly from said engaging portion so as to be spaced from said surface surrounding the opening of said tank;

said lid portion and said protruding portion of said outer peripheral wall defining an overflow passage communicating an interior of said reserve tank with an exterior of said reserve tank, said overflow passage including:

a radially extending groove formed in said lid portion; and a discharge groove formed by said protruding portion of said outer peripheral wall portion, said discharge groove communicating with said radially extending groove and extending downwardly from said radially extending groove to discharge fluid to the exterior of said reserve tank;

wherein said inlet pipe provides a restriction to fluid flow which is greater than the restriction to fluid flow provided by said overflow passage, said overflow passage permitting discharge of said fluid under pressure from said reserve tank while said engaging portion of said outer peripheral wall maintains said cap in secured covering relation with respect to said reserve tank.

20. A cap according to claim 19, wherein said discharge groove is substantially parallel with a longitudinal axis of said reserve tank when said cap is connected to said reserve tank.

21. A cap according to claim 19, wherein said outer peripheral wall defines a circle enclosing a portion of said connecting pipe; and said radially extending groove protrudes from said circle radially outwardly.

22. A cap according to claim 19, wherein an inlet of said overflow passage is coplanar with said lid portion.

23. A cap according to claim 19, wherein an outlet of said discharge groove is coplanar with an edge of said outer peripheral wall portion.

24. A cap according to claim 19, wherein said integrally molded unitary structure is formed by molding with a pair of dies.

25. A cap according to claim 19, further comprising a gasket, and wherein said cap fits onto said opening of said reserve tank so as to hold a periphery of said gasket in sealing relation with respect to said opening, said gasket having a communication hole for communicating an interior of said reserve tank with said overflow passage.

26. A cap for a reserve tank according to claim 19, wherein said lid portion and said radially extending groove formed therein, said outer peripheral wall and protruding portion thereof forming said discharge groove, and said connecting pipe extending through said lid portion are formed as an integrally molded structure; and said radially extending groove in said lid portion and said discharge groove formed by said protruding portion providing a continually opened path of fluid communication between said inlet connecting pipe and the exterior of said reserve tank so that high pressure fluid received with said reserve tank through said inlet connecting pipe can be discharged from said reserve tank through said radially extending groove and said discharge groove.

27. A cap for a reserve tank according to claim 26, wherein only a single protruding portion and single discharge groove is provided, and wherein said continuous peripheral contact provided by said engaging portion is disrupted by said single protruding portion and said single discharge groove.

28. A cap for a reserve tank according to claim 19, wherein an inlet to the connecting pipe and said discharge groove of said overflow passage are spaced approximately 180° with respect to one another in relation to a central axis of said cap.

29. A cap for a reserve tank according to claim 19, further comprising a gasket constructed and arranged to seal said opening, wherein said cap has a protrusion, and said gasket has an opening for receiving said protrusion to enable said cap and gasket to be properly positioned with respect to one another.

30. A cap for a reserve tank for a motor vehicle, said reserve tank constructed and arranged to contain cooling fluid under pressure for cooling the motor vehicle engine, said cap comprising:

a lid portion for covering an opening of said reserve tank:

an inlet connecting pipe extending through said lid portion and constructed and arranged to connect said reserve tank with an outside fluid source:

an outer peripheral wall integral with said lid portion, said outer peripheral wall portion extending from a periphery of said lid portion for securing said cap in covering relation with respect to said reserve tank, said outer peripheral wall portion having an engaging portion and a protruding portion, said engaging portion adapted to form continuous peripheral contact with a surface surrounding the opening of said tank, and said protruding portion radially outwardly from said engaging portion so as to be spaced from said surface of said tank surrounding the opening of said tank;

said lid portion and said protruding portion of said outer peripheral wall defining an overflow passage communicating an interior of said reserve tank with an exterior of said reserve tank, said overflow passage including:

a radially extending groove formed in said lid portion; and a discharge groove formed by said protruding portion of said outer peripheral wall portion, said discharge groove communicating with said radially extending groove and extending downwardly from said radially extending groove to discharge fluid to the exterior of said reserve tank;

wherein a smallest cross-sectional area of any inner diameter of said inlet connecting pipe is smaller than a smallest cross-sectional area of any inner diameter of said overflow passage.

31. A cap for a reserve tank according to claim 30, wherein said lid portion and said radially extending groove formed therein, said outer peripheral wall and protruding portion thereof forming said discharge groove, and said connecting pipe extending through said lid portion are formed as an integrally molded structure; and said radially extending groove in said lid portion and said discharge groove formed by said protruding portion providing a continually opened path of fluid communication between said inlet connecting pipe and the exterior of said reserve tank so that high pressure fluid received within said reserve tank through said inlet connecting pipe can be discharged from said reserve tank through said radially extending groove and said discharge groove.

32. A cap for a reserve tank according to claim 30, wherein only a single protruding portion and a single discharge groove is provided, and wherein said continuous peripheral contact provided by said engaging portion is disrupted by said single protruding potion and said single discharge groove.

33. A cap for a reserve tank according to claim 30, wherein an inlet to the connecting pipe and said discharge groove of said overflow passage are spaced approximately 180° with respect to one another in relation to a central axis of said cap.

34. A cap for a reserve tank according to claim 30, further comprising a gasket constructed and arranged to seal said opening, wherein said cap has a protrusion, and said gasket has an opening for receiving said protrusion to enable said cap and gasket to be properly positioned with respect to one another.

35. A cap according to claim 30, wherein said discharge groove is substantially parallel with a longitudinal axis of said reserve tank when said cap is connected to said reserve tank.

36. A cap according to claim 30, wherein said outer peripheral wall defines a circle enclosing a portion of said connecting pipe; and said radially extending groove protrudes from said circle radially outwardly.

37. A cap according to claim 30, wherein an outlet of said overflow passage is coplanar with said lid portion.

38. A cap according to claim 30, wherein an outlet of said discharge groove is coplanar with an edge of said outer peripheral wall portion.

39. A cap according to claim 30, wherein said integrally molded unitary structure is formed by molding with a pair of dies.

40. A cap according to claim 30, further comprising a gasket, and wherein said cap fits onto said opening of said reserve tank so as to hold a periphery of said gasket in sealing relation with respect to said opening, said gasket having a communication hole for communicating an interior of said reserve tank with overflow passage.

* * * * *